United States Patent
Bi et al.

(10) Patent No.: US 9,794,390 B2
(45) Date of Patent: Oct. 17, 2017

(54) GRAPHICAL INTERACTIVE VISUAL RESPONSE SYSTEM AND METHOD

(71) Applicant: AT&T INTELLECTUAL PROPERTY I, L.P., Atlanta, GA (US)

(72) Inventors: Haifeng Bi, San Antonio, TX (US); Xiaolian Bi, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 644 days.

(21) Appl. No.: 14/336,042

(22) Filed: Jul. 21, 2014

(65) Prior Publication Data

US 2014/0331177 A1 Nov. 6, 2014

Related U.S. Application Data

(63) Continuation of application No. 13/205,942, filed on Aug. 9, 2011, now Pat. No. 8,825,762.

(51) Int. Cl.
| | |
|---|---|
| *G06F 15/16* | (2006.01) |
| *G06Q 30/02* | (2012.01) |
| *H04L 29/08* | (2006.01) |
| *H04M 1/725* | (2006.01) |
| *G06F 3/0481* | (2013.01) |
| *G06F 3/0482* | (2013.01) |
| *G06F 3/0484* | (2013.01) |
| *H04M 3/493* | (2006.01) |
| *H04W 72/04* | (2009.01) |

(52) U.S. Cl.
CPC ...... *H04M 1/72522* (2013.01); *G06F 3/0482* (2013.01); *G06F 3/04817* (2013.01); *G06F 3/04842* (2013.01); *G06Q 30/0281* (2013.01); *H04L 67/141* (2013.01); *H04L 67/36* (2013.01); *H04M 3/493* (2013.01); *H04W 72/04* (2013.01)

(58) Field of Classification Search
CPC .......... H04M 1/72552; H04M 1/3493; H04W 72/04; G06F 3/0482; G06F 3/04842; G06Q 30/0281; H04L 67/141; H04L 67/36

See application file for complete search history.

(56) References Cited

U.S. PATENT DOCUMENTS

| | | | |
|---|---|---|---|
| 6,970,829 B1 * | 11/2005 | Leamon | G06Q 10/06 370/270 |
| 7,580,511 B2 | 8/2009 | Reynolds | |

(Continued)

*Primary Examiner* — Larry Donaghue
(74) *Attorney, Agent, or Firm* — Greenblum & Bernstein, P.L.C.

(57) ABSTRACT

A communications system and method is provided for facilitating access to a service center resource. A request is received from a mobile device of a user to access a service center associated with a destination specific application on the mobile device. The request includes information entered by the user and associated with the request. An identification of a service center resource of the service center that matches needs of the user based upon the information entered by the user and a determination of an availability of the service center resource is made. A first communication is launched to a communications address associated with the mobile device and a second communication is launched to a communications address associated with the service center resource. The first communication and the second communication are bridged.

20 Claims, 8 Drawing Sheets

(56) References Cited

U.S. PATENT DOCUMENTS

| | | | |
|---|---|---|---|
| 8,036,682 B1 * | 10/2011 | Davis | H04M 3/5231 |
| | | | 379/202.01 |
| 8,155,297 B1 * | 4/2012 | Dhir | H04M 3/42195 |
| | | | 379/210.01 |
| 8,572,303 B2 | 10/2013 | Lavian et al. | |
| 8,825,762 B2 | 9/2014 | Bi et al. | |
| 2002/0114432 A1 * | 8/2002 | Shaffer | H04M 3/523 |
| | | | 379/90.01 |
| 2003/0187988 A1 | 10/2003 | Lee et al. | |
| 2007/0064622 A1 | 3/2007 | Bi et al. | |
| 2007/0135101 A1 | 6/2007 | Ramati et al. | |
| 2007/0255611 A1 | 11/2007 | Mezo et al. | |
| 2007/0286180 A1 | 12/2007 | Marquette et al. | |
| 2008/0247521 A1 | 10/2008 | Bi et al. | |
| 2008/0300956 A1 * | 12/2008 | Nishikawa | G06Q 10/06 |
| | | | 705/7.14 |
| 2009/0094602 A1 * | 4/2009 | Ziskind | G01C 21/30 |
| | | | 717/178 |
| 2010/0158210 A1 | 6/2010 | Awad et al. | |
| 2010/0159890 A1 | 6/2010 | Sigmund et al. | |
| 2010/0195807 A1 | 8/2010 | Sigmund et al. | |
| 2012/0063574 A1 | 3/2012 | Or-Bach et al. | |
| 2012/0254859 A1 * | 10/2012 | DiCarlo | G06F 8/65 |
| | | | 717/178 |
| 2012/0309351 A1 * | 12/2012 | Dutta | G06Q 10/20 |
| | | | 455/411 |
| 2013/0038519 A1 | 2/2013 | Bi et al. | |
| 2013/0272510 A1 | 10/2013 | Mittal | |

* cited by examiner

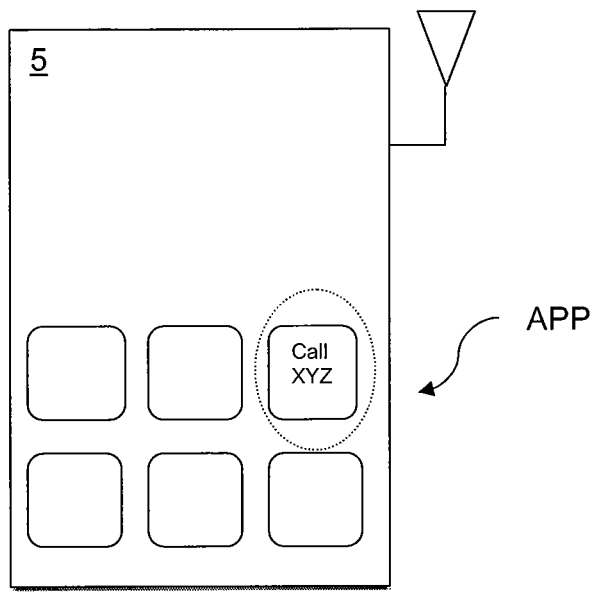
FIG. 3
FIG. 4
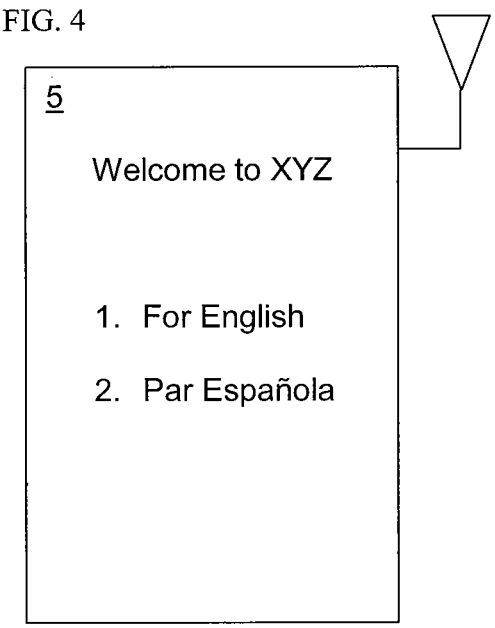

GRAPHICAL INTERACTIVE VISUAL RESPONSE SYSTEM AND METHOD

CROSS-REFERENCE TO RELATED APPLICATIONS

This is a continuation of pending U.S. patent application Ser. No. 13/205,942, filed on Aug. 9, 2011, the contents of which are expressly incorporated herein by reference in their entireties.

BACKGROUND

1. Field of the Disclosure

The present disclosure relates to the field of interactive visual response systems and methods. More particularly, the present disclosure relates to a graphical user interface to provide an interactive visual response system and method. The present invention relates generally to computer telephony, and more particularly to a graphical interactive visual response system using a network server in a telecommunications network.

2. Background Information

Interactive Voice Response (IVR) is a technology that allows a computer to interact with humans through the use of voice and keypad inputs. In telecommunications, IVR allows customers to interact with a company's database via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. IVR systems deployed in the network are sized to handle large call volumes.

Typically, an IVR system uses an embedded software application and has been in commercial use for decades. For example, banks often use an IVR system to allow customers to perform fiscal transactions such as updating the bank account using a telephone or Internet connection. Large businesses routinely use IVR systems in call centers to route incoming calls. Often in a call center IVR system, to resolve a product issue, a customer dials a customer care telephone number and enters a sequence of touch-tone keypad inputs. After obtaining relevant information regarding the issue, call center IVR system either presents an issue resolution, logs the issue for further investigation, and/or routes the customer to a relevant representative. Additionally, IVR systems may also be used for businesses, such as movie theatres, for selective information lookup such as finding movie schedules, theater locations etc.

FIG. 1 shows an exemplary network including an IVR system and a controller. The network 100 illustrates that a caller 101 communicates through a communications network 102. The caller 101 is connected to the IVR system 103, which interacts with the controller 104. The various functions of the intelligent interactive voice system may be performed by the IVR system 103, by the controller 104, or by a combination of the IVR system 103 and the controller 104 working together. Additionally, the caller may communicate using any one of many types of calling devices and communications networks 102. These devices may include a land-line telephone, a wireless phone, a personal digital assistant, VoIP, etc.

There are, however, a number of shortcomings associated with conventional IVR systems. As its name suggests, it is "voice" based. Therefore, menu selections appearing at the end of a menu require a user to listen through all other menu choices before reaching his selection. Additionally, while a user navigates through the IVR menu, or waits in the queue for speaking to a service representative, the call is in progress and any applicable charges apply. Mobile phone users are especially concerned where valuable mobile minutes are consumed while navigating through the IVR or waiting in the queue. Finally, the IVR menu system or the long waiting time frustrates the user who eventually loses patience and drops the call in dissatisfaction.

With the wide spread use of smartphones and computers that support graphical user interfaces (GUIs), many of the aforementioned shortcomings of traditional voice-based IVR may be overcome using a visual based graphical menu system.

BRIEF DESCRIPTION OF THE DRAWINGS

FIG. 3 is an illustrative embodiment of a graphical user interface (GUI) with an application icon in accordance with an embodiment of the invention.

FIG. 4 is an exemplary diagram of a welcome screen in accordance with the instant invention.

DETAILED DESCRIPTION

Figure 1:
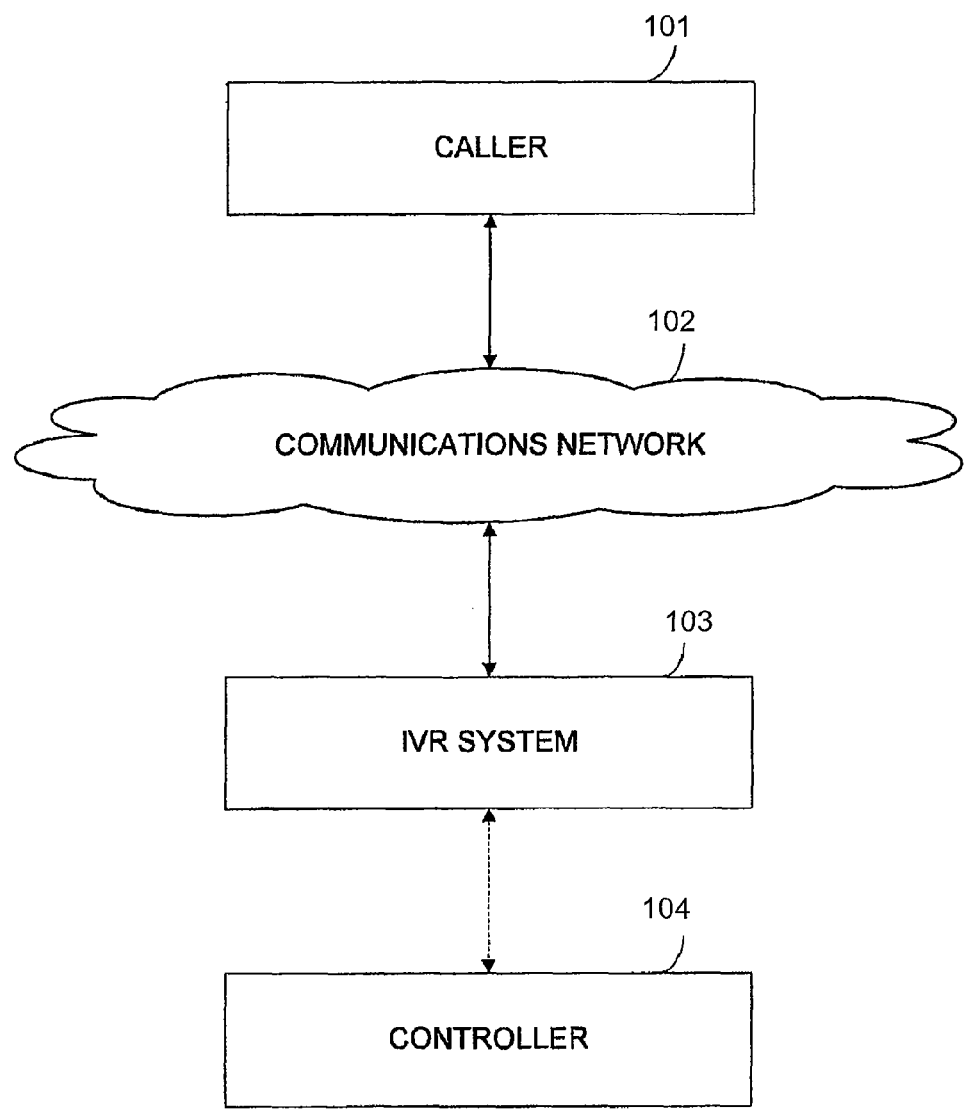
FIG. 1 shows an exemplary network including an IVR system and a controller.

In view of the foregoing, the present disclosure, through one or more of its various aspects, embodiments and/or specific features or sub-components, is thus intended to bring out one or more of the advantages as specifically noted below.

In one embodiment, a graphical interactive visual response system includes an application residing on a first end user device allowing the first end user to initiate a communication using a graphical user interface, the graphical user interface providing a menu of interactively selectable options; and a network server managing the initiated communication by the first end user to establish the communication based on information received from the first end user device as a result of the interactively selectable options.

In one aspect, the system further includes a second end user selected by the network server based upon the information received from the first end user device, wherein the network server determines availability of a second end user located at the second end user and establishes the communication between the second end user and the first end user device when the second end user is available.

In another aspect of the system, when the second end user is unavailable, the network server collects status information for display on the first end user device and queues the communication requested.

In still another aspect of the system, the selection of menu options on the first end user device enables the first end user to navigate through the graphical interactive visual response system and connect to the second end user based on the selections, wherein the connection occurs upon availability of the second end user.

In yet another aspect of the system, the first end user's device is one of a telephone, a mobile device and a personal computer and selections made on the first end user's device are transmitted to the network server via the device's data connection.

In another exemplary embodiment, there is an interactive visual response method including initiating an application residing on a first end user device allowing a communication using a graphical user interface, the graphical user interface providing a menu of interactively selectable options; and managing the initiated communication by the first end user via a network server to establish the communication based on information received from the first end user device as a result of the interactively selectable options.

In yet another exemplary embodiment, there is a non-transitory computer readable medium storing an executable program for providing information, the executable program, when executed by a processor, including initiating an application residing on a first end user device allowing a communication using a graphical user interface, the graphical user interface providing a menu of interactively selectable options; and managing the initiated communication by the first end user via a network server to establish the communication based on information received from the first end user device as a result of the interactively selectable options.

Figure 2:
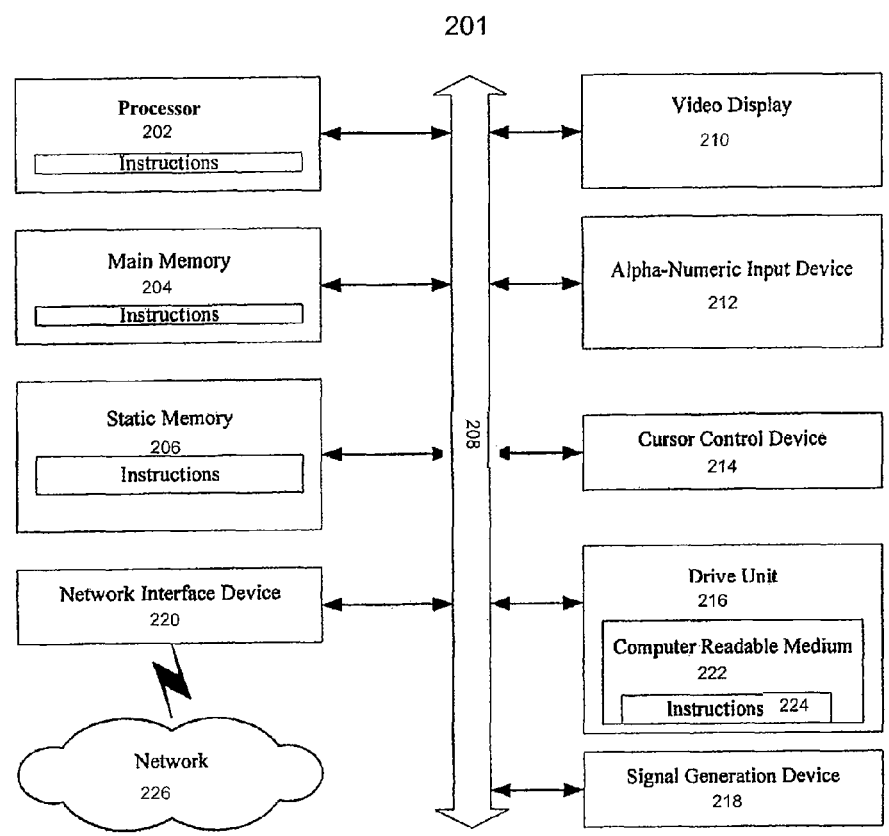
FIG. 2 is an illustrative embodiment of a general computer system, on which the graphical interactive visual response system and method can be implemented.

FIG. 2 is an illustrative embodiment of a general computer system, on which the graphical interactive visual response system and method can be implemented, which is shown and is designated 200. The computer system 200 can include a set of instructions that can be executed to cause the computer system 200 to perform any one or more of the methods or computer based functions disclosed herein. The computer system 200 may operate as a standalone device or may be connected, for example, using a network 226, to other computer systems or peripheral devices.

In a networked deployment, the computer system may operate in the capacity of a server or as a client user computer in a server-client user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a global positioning satellite (UPS) device, a palmtop computer, a laptop computer, a desktop computer, a communications device, a wireless telephone, a land-line telephone, a control system, a camera, a scanner, a facsimile machine, a printer, a pager, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, for example, a central processing unit (CPU), a graphics processing unit (GPU), or both. Moreover, the computer system 200 can include a main memory 204 and a static memory 206 that can communicate with each other via a bus 208. As shown, the computer system 202 may further include a video display unit 210, such as a liquid crystal display (LCD), an organic light emitting diode (OLED), a flat panel display, a solid state display, or a cathode ray tube (CRT). Additionally, the computer system 200 may include an input device 212, such as a keyboard, and a cursor control device 214, such as a mouse. The computer system 200 can also include a disk drive unit 216, a signal generation device 218, such as a speaker or remote control, and a network interface device 220.

In a particular embodiment, as depicted in FIG. 2, the disk drive unit 216 may include a computer-readable medium 222 in which one or more sets of instructions 224, e.g. software, can be embedded. A computer-readable medium 222 is a tangible article of manufacture, from which sets of instructions 224 can be read. Further, the instructions 224 may embody one or more of the methods or logic as described herein. In a particular embodiment, the instructions 224 may reside completely, or at least partially, within the main memory 204, the static memory 206, and/or within the processor 202 during execution by the computer system 200. The main memory 204 and the processor 202 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 222 that includes instructions 224 or receives and executes instructions 224 responsive to a propagated signal, so that a device connected to a network 226 can communicate voice, video or data over the network 126. Further, the instructions 224 may be transmitted or received over the network 226 via the network interface device 220.

FIG. 3 is an illustrative embodiment of a graphical user interface (GUI) with an application icon in accordance with an embodiment of the invention. Use and operation of the graphical IVR interface is described using an example, in this case a user calling a called party facility (a called party facility refers to any end user, such as an individual or machine, entity or location for which a call may be received or placed, such as a customer service department, a call center, or any other type of service to receive and place calls as readily understood) of a business to report a problem. More specifically in this example, a customer using a mobile device 5 (such as a smartphone) calls a customer service representative at a business to report a problem with his TV service. Although the example shows the graphical IVR interface on a mobile phone, it is not limited to such a device. Other devices, such as PDAs, computers, televisions or any other device capable of providing an interface (graphical or otherwise) may be used, as readily understood by the skilled artisan.

In this example, an application ("app") labeled "Call XYZ," which has been downloaded to the mobile phone, is circled and labeled APP. It is appreciated that although an app is being used in this example, the invention is not limited to such an embodiment as readily appreciated by the skilled artisan. In addition to the app, a network element or server (also referred to herein as the "IVR app server") is installed in the business' call center (or at a location remote from the call center) to carry out data communication with the user's mobile device and to establish calls between users and service representatives, and is discussed in more detail below. When the user wishes to call company XYZ to report a problem with his TV service, he initiates a call to XYZ by selecting the "Call XYZ" app on his mobile device 5. Selection can be made, for example, by touching the screen, using voice commands, pressing a button or function, or any other way known in the art. Upon initiation of the call, the interface will request the user to select an appropriate language, as depicted in FIG. 4. FIG. 4 is an exemplary diagram of a welcome screen in accordance with the instant invention. It is appreciated that FIG. 4 is merely exemplary in nature and not limited to such an embodiment. Moreover, additional language may be provided beyond English and Spanish.

Figure 5:
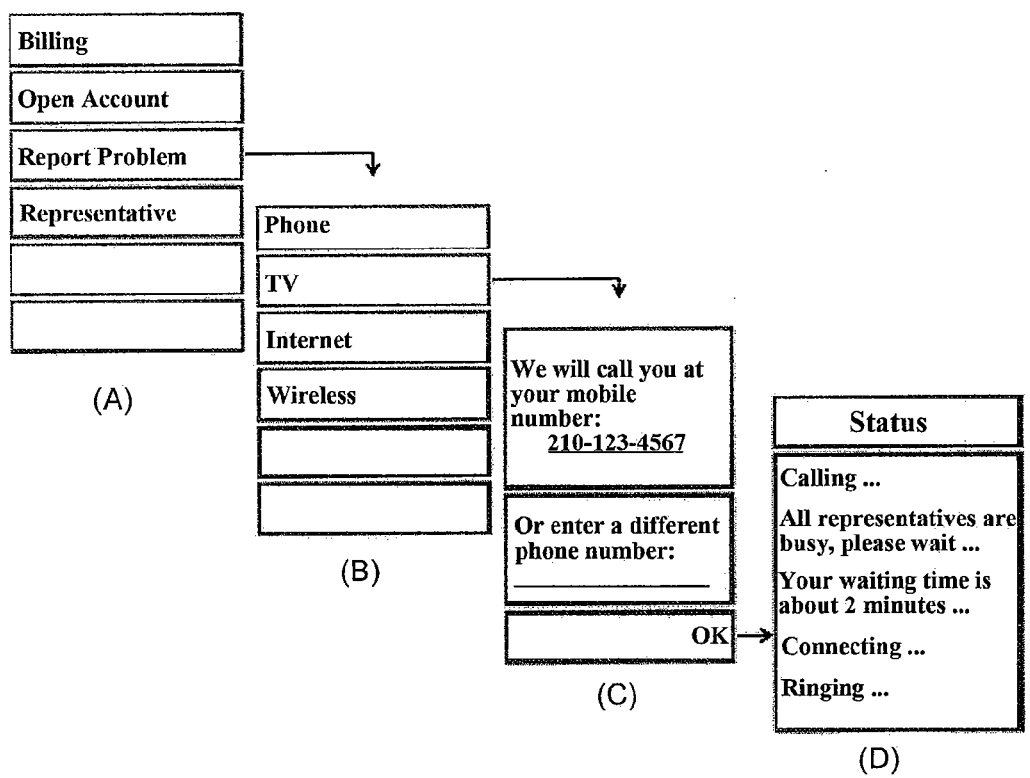
FIG. 5 illustrates an exemplary flow diagram of successive screen selections. The exemplary screen selections guide the user through the IVR choices, and ultimately establish the call to a service representative.

If selection "1. For English" is made, subsequent screen selections will then be shown in English. FIG. 5 illustrates an exemplary flow diagram of successive screen selections. The exemplary screen selections guide the user through the IVR options, and ultimately establish the call to a service representative. A discussion of the flow of the screen shots is discussed below. In this example, since the user is calling to report a problem with his TV service, the user selects "Report Problem" on screen (A), followed by "TV" on screen (B). The selections are transmitted to the IVR app server (discussed further below) by the user's mobile device via the mobile device's data connection (or any other connection established by the mobile device). The information transmitted to the IVR app server allows the business to ascertain information from the user to best direct the user to the appropriate department and representative or agent for handling the matter in connection with the information. In this case, since the user is requesting assistance with TV, the user will be directed to the customer service department that handles TV service problems.

Screen (C) of FIG. 5 displays a prompt to the user to enter a phone number that a service representative may call, or alternatively select the phone number of the mobile device which has been auto-populated by the app. In this example, the user indicates that calls should be received on his mobile device. The user therefore selects "OK" at the bottom right of the screen to proceed. This causes the IVR app server to attempt to establish a call between the user and a service representative in the department that handles TV problems. Screen (D) of FIG. 5 displays the status of the call as it is being established. In this exemplary flow diagram, the IVR app server detects that all service representatives are busy, and queues the user's request. The user is informed on his mobile device that the approximate wait time for a service representative to become available. During the waiting period (e.g. 2 minutes), although the user is placed in a queue to be called, a call is not established between the user and the service representative. Since a call is not established (i.e. the user does not wait on the call for the representative to answer), there is no dilution of mobile minutes for the user's account corresponding to the mobile device. Of course, it is appreciated that a connection to one end of the call may be established prior to establishing the connection between parties, if desired. When a service representative becomes available, the IVR app server rings the service representative as well as the user's mobile device. After the calls are answered, the IVR app server bridges the two calls and a connection is now established between the user and the customer service representative who handles TV service problems. Naturally, the connection can be made at any time to any one side, and need not wait for both the user and representative to answer.

Figure 6A:
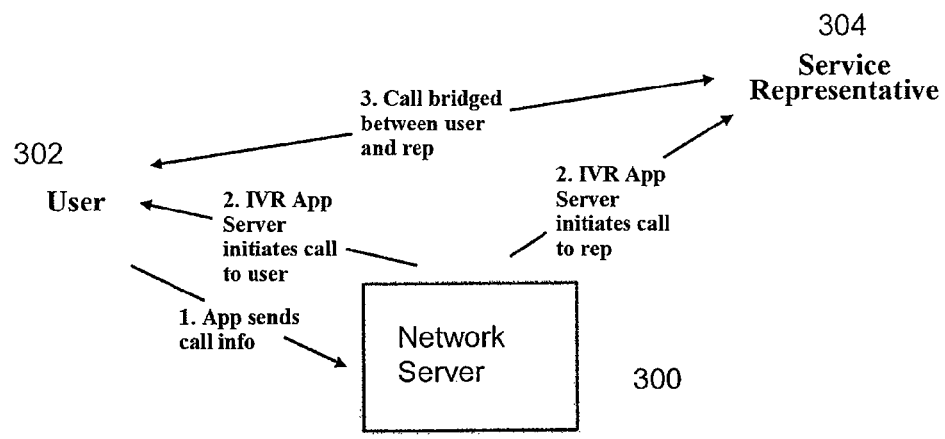
FIG. 6A illustrates an exemplary embodiment of the system in accordance with the invention.

FIG. 6A illustrates an exemplary embodiment of the system in accordance with the invention. The system includes, for example, an IVR app server 300, a requesting device of a first end user (e.g. user or caller) 302 and a second end user (e.g. customer service representative or callee) 304. The app, as previously explained, is installed on the user's mobile device 302 (or any other compatible device being used by the user) and an IVR app server 300 is installed at the business' call center (or at a remote location). By selection of the APP (shown in FIG. 3) on the mobile device 302, the user initiates calls to the customer service location (and representative) 304 by first launching the app on the mobile device 302, which through a set of successive menus collects and sends the user inputs and selections to the IVR app server 300 via the mobile device's data connection (the transmission of information is not limited only to the data connection per se, and could also be sent using any other type of connection). Once the IVR app server 300 has collected sufficient information, it locates a customer service location and representative 304 that matches or best matches requirements set forth in the acquired information. If the matched customer service location and representatives 304 are unavailable or busy, the IVR app server 300 queues the user's request and waits for the next available representative. During this waiting time, a connection (i.e. call) is not established between the user and customer representative 304. This provides freedom to the user to conduct other business will waiting for the customer representative, and does not use or waste any minutes associated with the mobile device 302. Of course, it is appreciated that a call may be established to one end of the call at any time during the wait period, if desired. When a customer representative 304 becomes available, the IVR app server 300 launches two calls, one to the user mobile device 302, and one to the customer service representative 304. After each call is answered, the IVR app server 300 bridges the two calls and a connection is established between the user and the appropriate service representative. It is appreciated that this is one exemplary embodiment in which a connection may be established. The IVR app server 300 may establish each call individually, simultaneously or in any other order or manner understood by the skilled artisan.

Figure 6B:
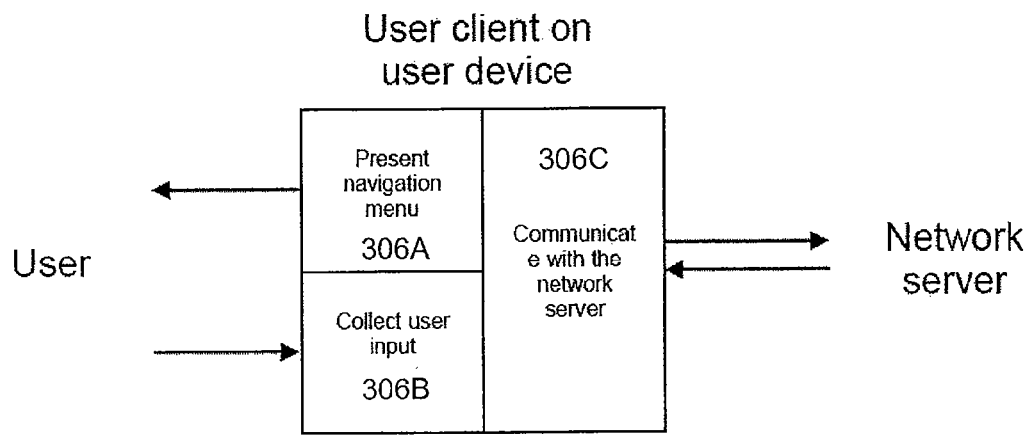
FIG. 6B illustrates and exemplary embodiment of a client on a user device in accordance with the invention.

FIG. 6B illustrates and exemplary embodiment of a client (app) on a user device in accordance with the invention. As explained, the user client 306 can be an application downloaded on a mobile device or a widget (i.e. a downloaded executable file) on a computer or any other similar device. The user client 306 may be developed specifically for use by individual businesses such as a bank, a credit card company, a car dealership, etc., and provided to their customers as alternatives to voice based-only IVRs that would normally greet their customers' phone calls. The design and implementation of the user client 306 can vary from one to the other. In general, a user client 306 includes, but is not limited to, three primary functions: presenting navigation menus to the user 306A; collecting user input 306B; and communicating with network server 306C.

Figure 6C:
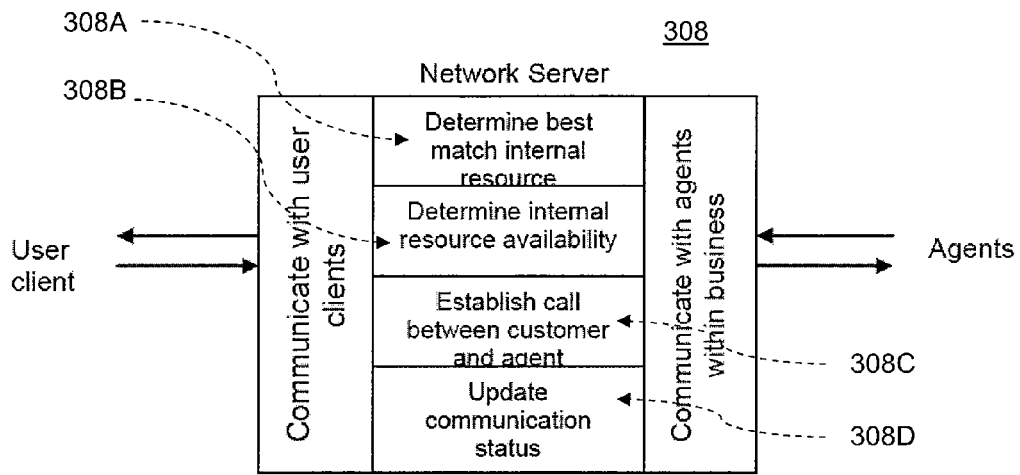
FIG. 6C illustrates an exemplary network server that is used in accordance with one embodiment of the instant invention.

FIG. 6C illustrates an exemplary network server that is used in accordance with one embodiment of the instant invention. The network element or server 308 is, for example, a special purpose computer that may be owned and/or operated either by the individual business or a communications service provider which provides the graphical IVR as a hosted service to customers. The network server 308 functions to connect the user mobile device 302 to an appropriate representative 304 within the business, similar to a traditional voice based IVR system. The composition of the network server 308 and its functional sub-blocks include, for example, determining a best match for internal resources 308A, determining internal resource availability 308B, establishment of calls between customer and representative (agent) 308C and updating communication status 308D.

As depicted in FIG. 6C, the network server 308 communicates with the user client over a network, such as the Internet, telephone network or any other type of network, and based on the input provided by the client, matches or best matches the customer request to the appropriate resource (such as technical support personnel). The network server 308 then checks the availability of the identified resource (for example, is the customer representative in technical support currently available?), and attempts to launch calls to both the customer and the customer service location and representative (for example, in the technical support department). The network server 308 also provides update information to the user's mobile device that includes status information during the process (for example, informing the customer with an approximate wait time), checks the availability of internal resources, and extends calls to the agents.

In this system, media in the connection between the customer (user's mobile device) and the agent (customer service location and representative) preferably does not go through the network server 308. Once the call is established, a direct media path is set up between the customer and the agent that does not traverse through the network server 308

Figure 6D:
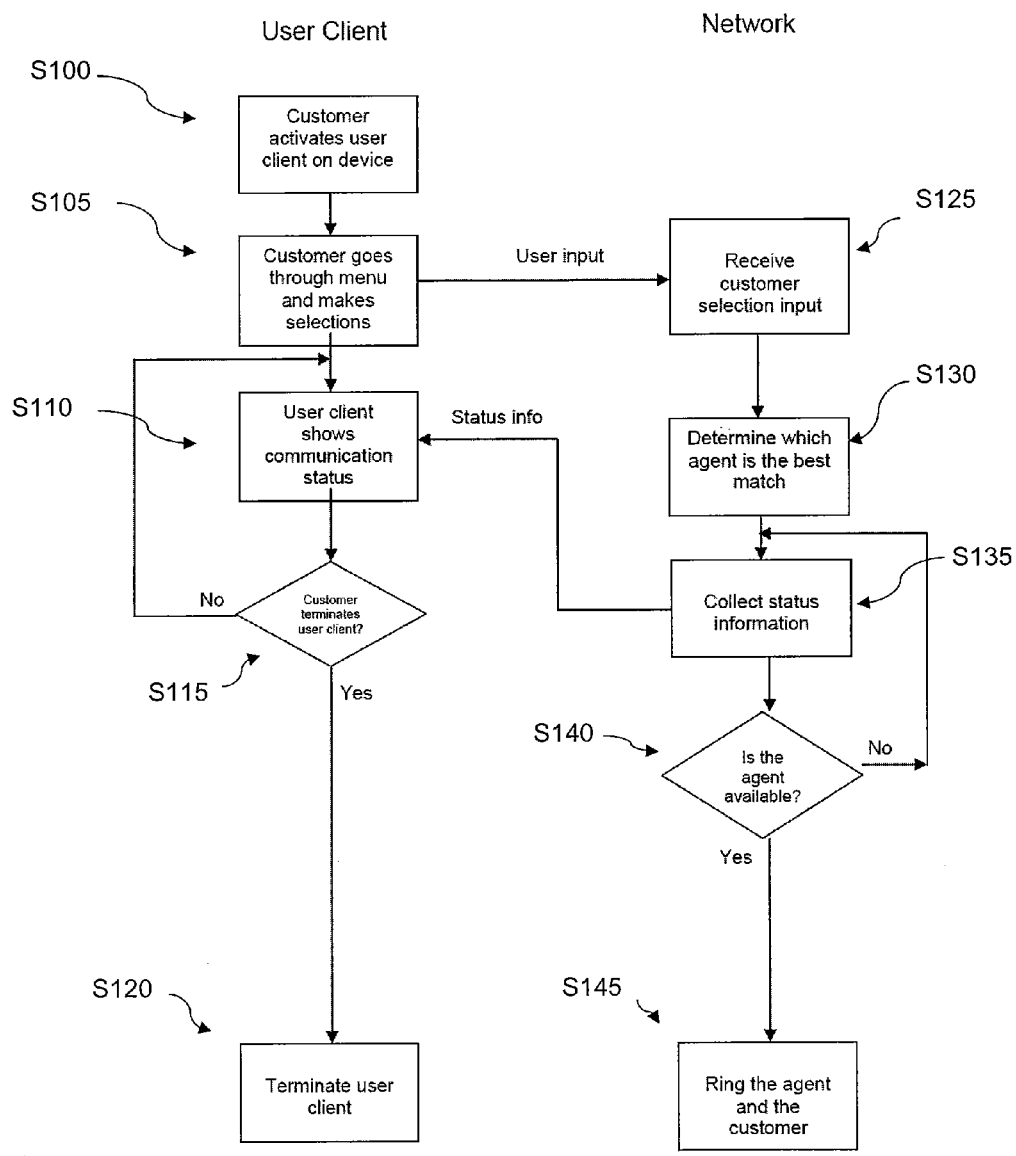
FIG. 6D is an exemplary flow diagram of an exchange of information between a user device and a customer service location and representative in accordance with an embodiment of the invention.

FIG. 6D is an exemplary flow diagram of an exchange of information between a user device and a customer service representative in accordance with an embodiment of the invention. The exchange of information includes, for example, a sequence of actions and interactions between a first end user (e.g. a user client) 302 and the network server 308 during a call attempt by a first end user (e.g. the customer) to a second end user (e.g. representative in the customer service location) 304. Data flow between the user client 302 and network server 308 is now described. In step S100, a customer activates the user client on the mobile device 302. For example, the user selects the "AT&T" app residing on their mobile device 302. The customer then steps through a menu (for example, as explained with reference to FIG. 5) and selects appropriate options at step S105. The customer selection is received on the network server 300, which determines a customer representative based on the customer selection (and/or any additional information supplied) at S130. For example, the customer may select "Report a Problem" for "TV" in the menu options. Based on the selections and availability of the customer representative, status information is collected and sent to the user client on the mobile device 302 in step S135. Here, the status information is displayed on the mobile device 302. At 5140, the network server determines whether the selected representative is available. If not, the process returns to S135 to collect updated status information. If, on the other hand, the representative is available, then the representative 304 and customer 302 are connected in S145. At any time, the customer may terminate the user client connection at S115 by exiting or otherwise terminating the client. If the customer has not terminated the user client, then the mobile device 302 waits for a connection to be made by the network server 300 to the representative 304. If, on the other hand, the customer terminates the user client, the user client ends at S120.

Figure 7A:
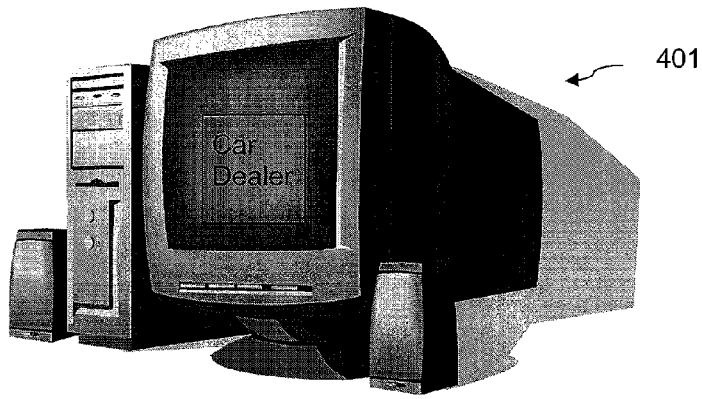
FIG. 7A shows an exemplary icon displayed on a screen for activating an application.
Figure 7B:
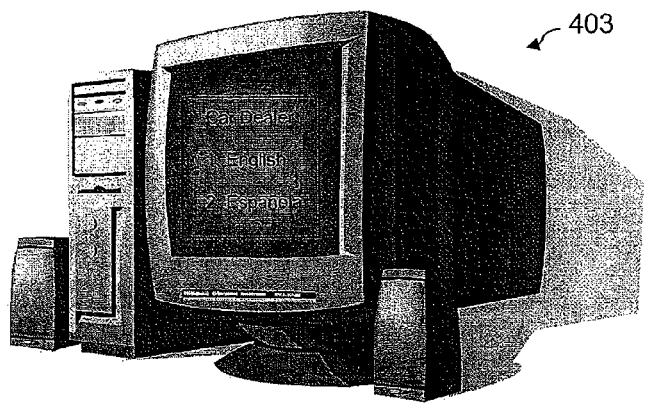
FIG. 7B shows an exemplary screen similar to FIG. 4 that has been modified for a specific representative/agent.

Operation of the graphical IVR is now described with reference to another exemplary embodiment. FIG. 7A shows an exemplary icon displayed on a screen for activating an application. In this example, the customer uses the graphical IVR on a computer, such as a personal computer or tablet, instead of a mobile device, such as a smartphone, to call a service representative of a business, such as car dealership. As shown in FIG. 7A, an app called "Hometown Car Dealer" has been made available (in this example, by the dealer) and installed on the customer computer 401 (in this example, by the customer downloading the app onto his computer). Additionally, as illustrated in FIG. 6A, the dealer has integrated its operations with the network server 300 such that it may connect with the customers. When a customer wishes to contact a representative at the car dealer, the installed app is launched on the customer's computer. Launching the app results, for example, in display of the first screen 403 as illustrated in FIG. 7B. FIG. 7B shows an exemplary screen similar to FIG. 4 that has been modified for a specific representative (in this case, for a car dealer). In the case where the customer selects "English," subsequent screens are displayed in English.

Figure 8:
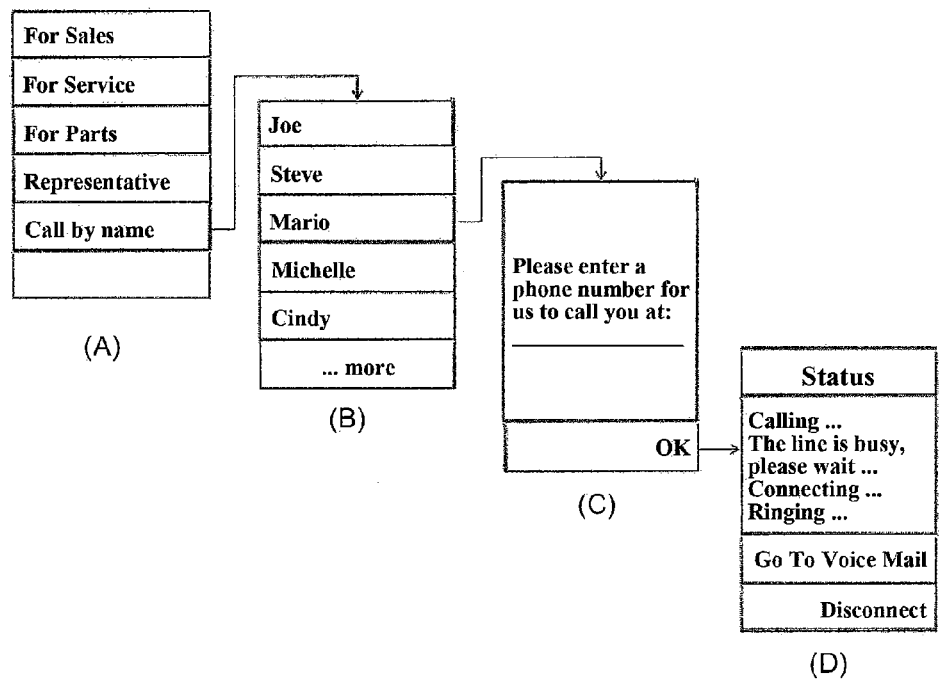
FIG. 8 illustrates an exemplary flow diagram of successive screen selections in the embodiment associated with FIGS. 7A and 7B.

FIG. 8 illustrates an exemplary flow diagram of successive screen selections in the embodiment associated with FIGS. 7A and 7B. The successive screens displayed on the computer guide the customer through selections and launch a connection to the representative of the dealer. In this example, on screen (A) the customer opts to select "call by name." On screen (B), the customer selects "Mario." On screen (C), the customer is prompted to enter a phone number for accepting the call (connection). In some cases, the computer may have a phone number associated therewith. In other cases, a phone number may not be associated with the computer, requiring the customer to provide a phone number(s) (which can be stored by the app for future use, for example). On screen (D), the IVR app server (network server) 300 attempts to connect the customer to Mario. However, in this example, Mario's line is busy and the customer is asked to hold. While waiting for Mario, the customer is provided with several options: (1) choose to leave Mario a message by pressing "Go To Voice Mail"; (2)

tell the IVR app server to abandon the call attempt by pressing "Disconnect"; (3) hold and wait for Mario to become available. It is appreciated that the invention is not limited to these three options, which are exemplary in nature. If the customer decides to hold, the IVR app server launches two calls, one to the customer at the indicated phone number, and one to Mario at the dealer. After both answer their calls, the IVR app server bridges the two calls and a connection is established between the customer and agent (Mario). It is appreciated that during the hold/wait period, the customer does not need to remain on the computer or phone while waiting for the representative to become available. Rather, when the representative becomes available, the IVR app server calls the customer for connection to the representative, thereby saving time and not introducing any costs associated with a customer device.

In another embodiment, instead of the car dealer owning and operating the IVR app server 300, the car dealer may obtain such capability from a communications service provider which owns and operates the IVR app server and provides such capability as a hosted service to businesses to handle their customer calls.

With the graphical IVR of the invention, a user may navigate a phone menu system on a GUI based communication device, such as a smartphone or a computer in a visual manner. This is accomplished using, for example, an app installed on the user GUI device (such as the smartphone and computer), and an IVR app server (network server) that gathers the user input and establishes a connection.

A graphics-based menu design helps users navigate through selections more effectively compared to traditional voice or button navigation. Since the system is visual (graphical) as opposed to voice or button based, the menu selection is faster and more efficient for the user than the traditional voice based IVR. Users do not have to listen through all of the options in a serial manner as necessary with a traditional voice based IVR. With a graphical IVR, users can make menu selections quickly by selection of options through the various menus.

The graphical IVR provides a more user-friendly calling experience to customers and helps to increase call success rate and ultimately improve customer satisfaction.

Accordingly, the present invention enables a customer to use an IVR by way of a graphical interface such that a connection is established between parties (e.g. customer and agent) when they become available. This prevents the long holding time customers often experience dialing into IVR systems in order to find an appropriate representative.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing Detailed Description.

What is claimed is:

1. A method of facilitating access to a service center resource, comprising:
receiving a request from a mobile device of a user to access a service center associated with a destination specific application that resides on the mobile device that allows the user to interact with the destination specific application and the destination specific application to interact with the user before a communication based upon the request is initiated, the request including information entered by the user and associated with the request;
identifying, with a processor, a service center resource of the service center that matches needs of the user based upon the information entered by the user;
determining an availability of the service center resource;
sending status information to the mobile device;
launching a first communication to a communications address associated with the mobile device;
launching a second communication to a communications address associated with the service center resource; and
bridging the first communication and the second communication, wherein a connection is established between the communications address associated with the mobile device and the communications address associated with the service center resource.

2. The method of claim 1, further comprising queueing the request and waiting for an available service center resource when it is determined that an identified service center resource is unavailable.

3. The method of claim 1, wherein the status information includes an approximate wait time as to an availability of an unavailable service center resource.

4. The method of claim 1, wherein the determining the availability of the service center resource comprises repeatedly checking the availability of the service center resource.

5. The method of claim 1, wherein the information entered by the user includes a response to a menu of possible selections.

6. The method of claim 1, wherein the receiving the request is initiated in response to a selection of a graphical user interface icon associated with the service center.

7. The method of claim 1, wherein the receiving the request is initiated in response to a selection of a graphical user interface icon associated with the destination specific application installed on the mobile device.

8. The method of claim 1, further comprising receiving a selection from the user associated with a handling of the request when the service center resource is unavailable.

9. The method of claim 1, further comprising receiving the request in a language selected by the user.

10. The method of claim 1, further comprising sending a message to the mobile device that a communication to the service center resource is being established.

11. A non-transitory computer readable storage medium encoded with an executable computer program that facilitates access to a service center resource and that, when executed by a processor, causes the processor to perform operations comprising:
receiving a request from a mobile device of a user to access a service center associated with a destination specific application that resides on the mobile device that allows the user to interact with the destination specific application and the destination specific application to interact with the user before a communication based upon the request is initiated, the request including information entered by the user and associated with the request;
identifying a service center resource of the service center that matches needs of the user based upon the information entered by the user;
determining an availability of the service center resource;
sending status information to the mobile device;
launching a first communication to a communications address associated with the mobile device;
launching a second communication to a communications address associated with the service center resource; and
bridging the first communication and the second communication, wherein a connection is established between the communications address associated with the mobile device and the communications address associated with the service center resource.

12. The non-transitory computer readable storage medium of claim 11, further comprising queueing the request and waiting for an available service center resource when it is determined that an identified service center resource is unavailable.

13. The non-transitory computer readable storage medium of claim 11, wherein the status information includes an approximate wait time as to an availability of an unavailable service center resource.

14. The non-transitory computer readable storage medium of claim 11, wherein the determining the availability of the service center resource comprises repeatedly checking the availability of the service center resource.

15. The non-transitory computer readable storage medium of claim 11, wherein the information entered by the user includes a response to a menu of possible selections.

16. The non-transitory computer readable storage medium of claim 11, wherein the receiving the request is initiated in response to a selection of a graphical user interface icon associated with the service center.

17. The non-transitory computer readable storage medium of claim 11, wherein the receiving the request is initiated in response to a selection of a graphical user interface icon associated with the destination specific application installed on the mobile device.

18. The non-transitory computer readable storage medium of claim 11, further comprising receiving a selection from the user associated with a handling of the request when the service center resource is unavailable.

19. The non-transitory computer readable storage medium of claim 11, further comprising receiving the request in a language selected by the user.

20. A computer comprising:
a memory that stores executable instructions;

a processor that executes the executable instructions;
wherein the computer receives a request from a mobile device of a user to access a service center associated with a destination specific application that resides on the mobile device that allows the user to interact with the destination specific application and the destination specific application to interact with the user before a communication based upon the request is initiated, the request including information entered by the user and associated with the request, identifies a service center resource of the service center that matches needs of the user based upon the information entered by the user, determines an availability of the service center resource, sends status information to the mobile device, launches a first communication to a communications address associated with the mobile device, launches a second communication to a communications address associated with the resource, and bridges the first communication and the second communication, wherein a connection is established between the communications address associated with the mobile device and the communications address associated with the service center resource.

* * * * *